United States Patent
Bronk et al.

(10) Patent No.: US 11,453,602 B2
(45) Date of Patent: Sep. 27, 2022

(54) WASTEWATER CLEANING SYSTEM AND PROCESS

(71) Applicant: Evoqua Water Technologies LLC, Pittsburgh, PA (US)

(72) Inventors: Matthew Bronk, Sussex, WI (US); Argun Olcayto Erdogan, Greenfield, WI (US); Nathan Antonneau, Queen Creek, AZ (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 123 days.

(21) Appl. No.: 16/630,742

(22) PCT Filed: Jul. 10, 2018

(86) PCT No.: PCT/US2018/041391
§ 371 (c)(1),
(2) Date: Jan. 13, 2020

(87) PCT Pub. No.: WO2019/014180
PCT Pub. Date: Jan. 17, 2019

(65) Prior Publication Data
US 2020/0156963 A1    May 21, 2020

Related U.S. Application Data

(60) Provisional application No. 62/532,043, filed on Jul. 13, 2017.

(51) Int. Cl.
*C02F 1/38*    (2006.01)
*C02F 1/00*    (2006.01)
(Continued)

(52) U.S. Cl.
CPC .............. *C02F 1/38* (2013.01); *C02F 1/004* (2013.01); *C02F 3/2866* (2013.01);
(Continued)

(58) Field of Classification Search
None
See application file for complete search history.

(56) References Cited

U.S. PATENT DOCUMENTS 5,587,067 A     12/1996 Love
7,329,343 B1 *  2/2008 Barnes .................. C02F 1/78
                                                         210/167.1
(Continued)

*Primary Examiner* — Richard C Gurtowski

(57) ABSTRACT

Systems and method for treating wastewater including a vessel having an inlet and an outlet, a pump in fluid communication with the outlet of the vessel, the pump configured to pump wastewater out of the vessel, a separator in fluid communication with the pump, the separator configured to separate grit from the wastewater, the separator having a first outlet for discharging a grit stream and a second outlet for discharging a wastewater stream, a grit washing system in fluid communication with a source of washing fluid and the first outlet of the separator, the grit washing system configured to wash and dewater grit from the grit stream, the grit washing system having an outlet for discharging a wash wastewater stream, and a return conduit configured to recycle the wastewater stream discharged from the separator to one of the inlet of the vessel and an inlet to the pump.

19 Claims, 5 Drawing Sheets

(51) Int. Cl.
*C02F 3/28* (2006.01)
*C02F 11/126* (2019.01)
*C02F 1/52* (2006.01)
*C02F 11/14* (2019.01)

(52) U.S. Cl.
CPC .......... *C02F 11/126* (2013.01); *C02F 1/5281* (2013.01); *C02F 11/14* (2013.01); *C02F 2209/003* (2013.01); *C02F 2209/006* (2013.01); *C02F 2209/40* (2013.01); *C02F 2209/44* (2013.01); *C02F 2301/046* (2013.01); *C02F 2303/24* (2013.01)

(56) References Cited

U.S. PATENT DOCUMENTS

| | | |
|---|---|---|
| 2004/0060862 A1 | 4/2004 | Savage et al. |
| 2009/0057234 A1* | 3/2009 | Armstrong ................ C02F 1/38 210/703 |
| 2010/0012560 A1* | 1/2010 | Sims ....................... B01F 21/20 210/126 |
| 2011/0272349 A1* | 11/2011 | Rausch ................... C02F 3/327 210/151 |
| 2012/0285895 A1 | 11/2012 | Smiddy |
| 2014/0021137 A1 | 1/2014 | Smiddy et al. |
| 2014/0246369 A1 | 9/2014 | Stephenson et al. |
| 2014/0263010 A1 | 9/2014 | Liu et al. |
| 2017/0113952 A1 | 4/2017 | Stephenson et al. |

* cited by examiner

WASTEWATER CLEANING SYSTEM AND PROCESS

RELATED APPLICATIONS

This application claims priority under 35 U.S.C. § 119(e) to U.S. Provisional Application Ser. No. 62/532,043 titled "CLEANING SYSTEM FOR ACTIVE ANAEROBIC DIGESTER," filed on Jul. 13, 2017, which is herein incorporated by reference in its entirety.

BACKGROUND

1. Field of Disclosure

Aspects and embodiments of the present invention are generally directed to cleaning of wastewater processing and storage tanks.

2. Discussion of Related Art

Methods for treating wastewater generated from industrial and municipal sources include biological, physical, and/or chemical processes. For instance, biological treatment of wastewater includes aerobic and/or anaerobic treatment units to reduce the total organic content and/or biochemical oxygen demand of the wastewater. Accumulation of grit material in the digestive tanks used for anaerobically treating the wastewater causes several problems, including a decrease in the active volume of the digester over time.

SUMMARY

Aspects and embodiments are directed to a method and system for economically removing grit from wastewater without interrupting normal operation of wastewater processes.

In accordance with an aspect of the present disclosure there is provided a wastewater treatment system. The wastewater treatment system comprises a vessel having an inlet and an outlet, a pump in fluid communication with the outlet of the vessel, the pump configured to pump wastewater out of the vessel, a separator in fluid communication with the pump, the separator configured to separate grit from the wastewater, the separator having a first outlet for discharging a grit stream and a second outlet for discharging a wastewater stream, a grit washing system in fluid communication with a source of washing fluid and the first outlet of the separator, the grit washing system configured to wash and dewater grit from the grit stream, the grit washing system having an outlet for discharging a wash wastewater stream, and a return conduit configured to recycle the wastewater stream discharged from the separator to one of the inlet of the vessel and an inlet to the pump.

In accordance with some embodiments the return conduit is a first return conduit and the system further comprises a second return conduit configured to recycle the wash wastewater stream from the grit washing system to the inlet of the vessel.

In accordance with some embodiments the system further comprises one or more of a dilution water supply and a chemical cleaning system in fluid communication with the wastewater pumped out of the vessel by the pump.

In accordance with some embodiments the wastewater stream discharged from the separator has a volatile suspended solids (VSS) concentration of at least 30%.

In accordance with some embodiments the system further comprises a hydraulic mixing system configured to impart a motive force on wastewater contained in the vessel.

In accordance with some embodiments the pump is fluidly connectable to an internal volume of the vessel via a supply conduit and a return conduit, the supply conduit fluidly connectable to a discharge side of the pump and the return conduit fluidly connectable to a suction side of the pump.

In accordance with some embodiments the first return conduit is configured to recycle the wastewater stream discharged from the separator to the inlet of the pump.

In accordance with some embodiments the system further comprises a controller configured to control the pump such that the pump continuously pumps wastewater out of the vessel for a predetermined length of time.

In accordance with some embodiments the system further comprises a flow meter in communication with the controller and configured to measure a flow rate of wastewater pumped out of the vessel, the controller configured to calculate the predetermined length of time based at least in part on the measured flow rate.

In accordance with some embodiments the system further comprises a sensor configured to measure at least one property of wastewater contained in the vessel and a controller in communication with the sensor and the pump and configured to control the pump based on the at least one measured property.

In accordance with some embodiments the pump is configured to continuously pump wastewater out of the vessel.

In accordance with some embodiments the vessel is configured to perform at least one of digestion, blending, and holding.

In accordance with some embodiments the separator is configured as a cyclone separator. In accordance with another aspect of the present disclosure there is provided a method for treating wastewater containing grit. The method comprises removing the wastewater containing grit from a vessel, separating the grit from the wastewater containing grit to form a grit stream and a wastewater stream, washing and dewatering the grit stream to form a grit material and a wash wastewater stream, and recycling the wastewater stream to one of an inlet of the vessel and to the wastewater containing grit removed from the vessel.

In accordance with some embodiments removing the wastewater from the vessel includes introducing a portion of the wastewater into a recirculation loop fluidly connected between an outlet of the vessel and an inlet of the vessel.

In accordance with some embodiments the portion of the wastewater is introduced into the recirculation loop for a predetermined length of time.

In accordance with some embodiments the method further comprise measuring a flow rate of the wastewater in the recirculation loop and calculating the predetermined length of time based at least in part on the measured flow rate.

In accordance with some embodiments the method further comprises diluting the wastewater removed from the vessel prior to separating the grit from the wastewater.

In accordance with some embodiments separating the grit from the wastewater comprises passing the wastewater through a cyclone separator.

In accordance with some embodiments the wastewater is continuously removed from the vessel.

In accordance with some embodiments the wastewater is removed from the vessel for a predetermined length of time per day.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
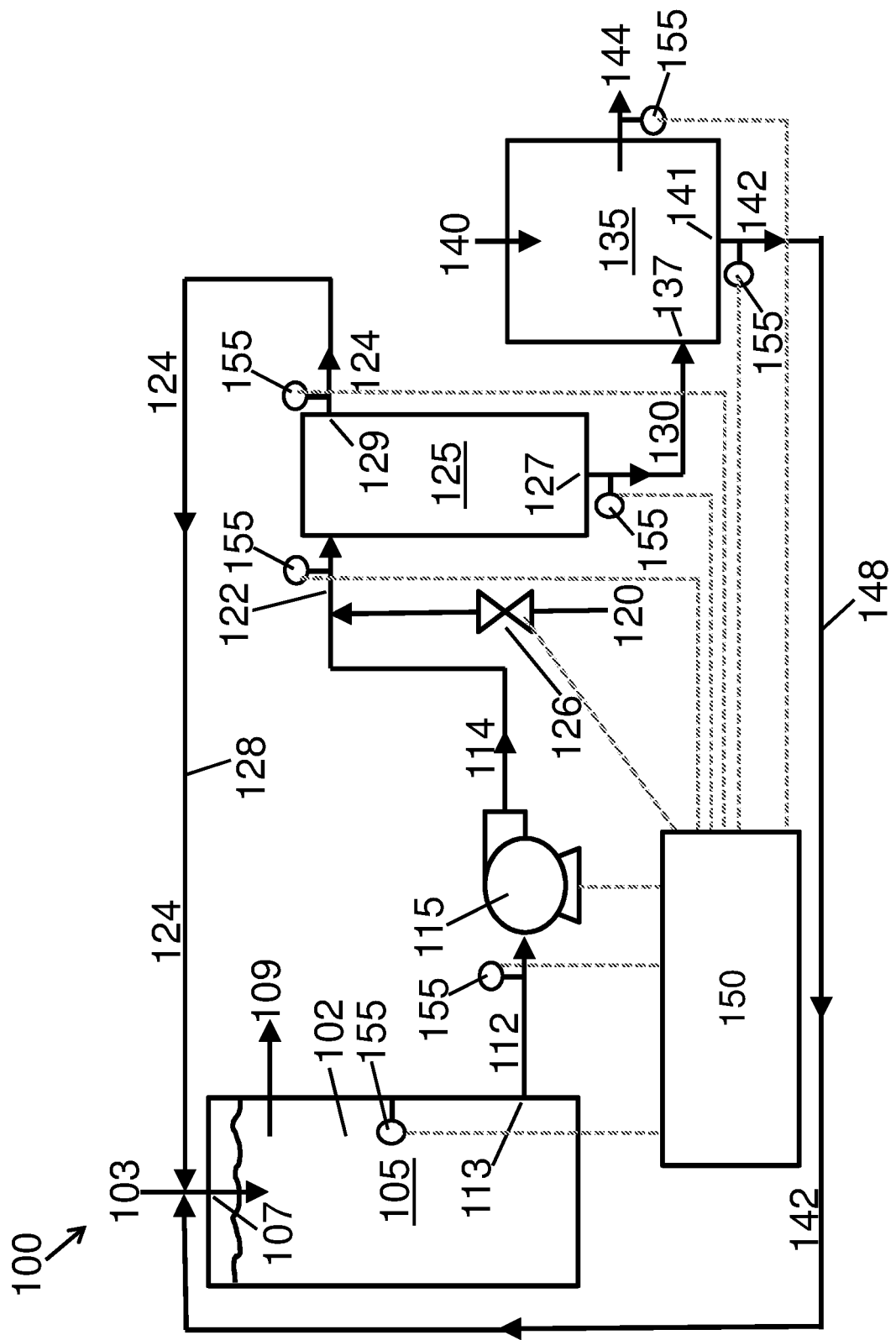
FIG. 1 is a block flow diagram of a one example of a wastewater treatment system in accordance with aspects of the invention.

Wastewater treatment systems use various processes for treating wastewater generated from municipal and industrial sources. Wastewater treatment typically includes three general phases. The first phase, or primary treatment, involves mechanically separating dense solids from less dense solids and liquids in the wastewater. Primary treatment is typically performed in sedimentation tanks using gravity separation. The second phase, or secondary treatment, involves biological conversion of carbonaceous and nutrient material in the wastewater to more environmentally friendly forms. Secondary treatment is typically performed by promoting the consumption of the carbonaceous and nutrient material by bacteria and other types of beneficial organisms already present in the wastewater or that are mixed into the wastewater. The third phase, or tertiary treatment, involves removing the remaining pollutant material from the wastewater. Tertiary treatment is typically performed by filtration or sedimentation with the optional addition of chemicals, UV light, and/or ozone to neutralize harmful organisms and remove any remaining pollutant material.

Tanks are often used throughout treatment for purposes of processing, mixing, and/or storing wastewater. The accumulation of heavy discrete solids (grit) within these tanks can cause several problems. For example, grit may disrupt biological processes and reduces effluent quality. The accumulation of grit causes a decrease in usable reactor volume over time (i.e., reduce the treatment capacity), which can lead to process issues such as gas handling and incomplete sludge digestion. Grit can also cause wear on mechanical equipment, such as impellers. Conventional methods for removing the grit can require decommissioning and cleaning the tank, which is costly and reduces productivity of the system.

Grit may enter a municipal or other type of wastewater treatment system from any number of sources, including a collection system (e.g., materials input by homeowners or infiltration/inflow sources), and other sources such as damaged piping. Grit may also be the result of material breakdown or a byproduct of biochemical processes. Despite pre-processing filtering techniques, grit has been found to accumulate in tanks used in treatment and storage phases of wastewater treatment. As used herein, the term "grit" refers generally to discrete inorganic and organic settleable solid material that is not biodegraded by secondary treatment or sludge processing. Non-limiting examples of grit materials include sand, gravel, cinders, asphalt, and concrete, as well as struvite, vivianite, calcite, iron oxides, granular organic matter, seeds, eggshells, bone chips, and coffee grounds. Grit has a higher specific gravity than biodegradable organic solids and water and can therefore accumulate at the bottom of the tank. Grit particles may be spherical, flat, or angular. Grit particles may have a size in a range of 10 microns to five millimeters.

Aspects and embodiments of the disclosed systems and processes are configured to remove grit materials from tanks used in wastewater treatment without having to decommission the tank and with minimal or no interference to the regular operational use of the tank. The disclosed cleaning processes and systems are also much less expensive and do not create the productivity losses associated with conventional techniques that require decommissioning the tank and removing the grit content manually. Removal of grit in accordance with the disclosed systems and processes allows for greater reactor capacity and an increase in byproduct (e.g., biogas) production while prolonging the required cleaning interval, as well as reducing the effort required during cleaning. For instance, wastewater within a digester will have a higher volatile suspended solids (VSS) concentration, which will yield higher gas production and more efficient digestion.

In accordance with one or more embodiments, the methods and systems described herein relate to treating wastewater. One or more embodiments pertinent to some aspects of the invention can involve methods and techniques of treating wastewater that comprise removing wastewater from a vessel and separating grit from the wastewater. The source of wastewater that is contained in the vessel may be municipal wastewater or industrial wastewater, such as output wastewater from electric power plants, agricultural and food operations, chemical plants, or manufacturing plants. According to certain embodiments, the wastewater may include wastewater from any one of a primary, secondary, or tertiary wastewater treatment process. For example, the wastewater may comprise activated sludge.

A schematic of a wastewater treatment system according to one embodiment is shown generally at 100 in FIG. 1. The system 100 includes a tank or vessel 105, a pump 115, a separator 125, a grit washing system 135, and optional chemical cleaning system 145.

The vessel 105 functions as a containment unit for wastewater 102. As used herein, the terms "vessel" and "tank" are used interchangeably and broadly refer any structure suitable for confining one or more process components, including gas, liquid, and solid components and mixture thereof. The vessel 105 may be open to the environment, or may be closed, and may be sized and shaped according to a desired application and volume of wastewater to be stored and/or or treated. According to some embodiments, the vessel 105 is cylindrical in shape, but in alternative embodiments, the vessel may have sidewalls with multiple, non-continuous side portions, such as an octagon or hexagon. The vessel 105 may be constructed of any material suitable for the purposes of the methods and systems described herein. Non-limiting examples of suitable materials include steel, including stainless steel, fiberglass reinforced plastic, polyvinyl chloride (PVC), polyvinylidene fluoride (PVDF). High-density polyethylene (HDPE), concrete, and in some instances, porcelain coated steel or glass-lined products. The floor of the vessel 105 may be flat and horizontal or of a slightly conical configuration with the tip of the cone pointing either upward or downward.

The vessel 105 includes an inlet 107 and an outlet 113. The inlet 107 may be fluidly connectable to a source of wastewater 103 as previously described. Wastewater contained in the vessel is referenced as 102 in the figures and may be wastewater that is undergoing treatment or storage processes and may also contain grit. According to some embodiments the wastewater 102 may be activated sludge. Treated wastewater exits the vessel 105 as 109 and may undergo further processing. According to some embodiments, the wastewater 102 has a total suspended solids (TSS) concentration in a range of about 0.5% to about 20% (about 500 mg/L to about 200 g/L). In other embodiments, the wastewater 102 has a TSS concentration of 2% to about 6% (about 20 g/L to about 60 g/L).

According to various aspects, the vessel 105 may be configured to perform at least one of digestion, blending, and holding processes, which are each described below.

In certain embodiments, the vessel 105 may be configured to perform one or more digestion processes on the wastewater, including anaerobic digestion, aerobic digestion, and facultative digestion. Anaerobic digestion processes typically decompose or otherwise break down organic compounds present in the solids in the absence of oxygen by facultative and anaerobic microorganisms which convert a substantial portion of the stored carbon into methane. In contrast, during aerobic digestion aerobic and facultative microorganisms use oxygen to produce mainly carbon dioxide and water.

According to some embodiments, the vessel 105 may be configured to perform blending processes. For example, sludge or waste solids blending tanks may be used prior to anaerobic digestion or solids utilization. Blending tanks combine primary and secondary sludges from upstream process for purposes of providing a uniform feed to the digester or solids handling equipment (e.g., pumps).

According to still other embodiments, the vessel 105 may be configured to perform holding or storing processes, where the vessel 105 is configured to store wastewater, including sludge, over a period of time. The vessel 105 may be used for temporary or long-term storage that functions to allow for process flexibility or to provide further sludge stabilization prior to disposal. For instance, in some instances the vessel 105 may be used to thicken the wastewater.

In accordance with one or more embodiments the wastewater 102 in the vessel 105 may be dosed with at least one of a flocculant and coagulant. The flocculant may comprise a material or a chemical that promotes flocculation by causing colloids and particles or other suspended particles in liquids to aggregate, forming a floc. The effect causes particles to cluster together into a floc. Certain polymers may be used as flocculants, such as polyacrylamides. The coagulant may include cations or other positively charged molecules, such as cations of aluminum, iron, calcium, and magnesium. The cations are capable of interacting with negatively charged particles and molecules such that barriers to aggregation are reduced. For instance, the coagulant may remove phosphorus from the wastewater 102. Non-limiting examples of coagulants include bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

The pump 115 may be a motor driven pump that is positioned external to the vessel 105 and is in fluid communication with an outlet 113 of the vessel 105. The pump 115 is configured to pump wastewater 102 out of the vessel 105 prior to separation or out of a separate storage container after separation. The pump 115 may be driven by electric, air-driven, or fuel power and may be sized based on the size of the vessel 105, the desired flow rate, and the type of wastewater 102 being pumped. In accordance with one embodiment, the pump 115 may be any one of a centrifugal, positive displacement, or progressive cavity type of pump. According to certain embodiments, the pump 115 may be a chopper pump. In one embodiment, the pump 115 is a chopper pump that uses a centrifugal chopper impeller. According to some embodiments, the pump 115 may be controlled by a controller 150 (discussed in further detail below). In certain embodiments, the pump may be controlled by the controller 150 based on measurements taken by one or more sensors 155 (described in further detail below). The pump may be a dedicated pump for grit separation, or used for another or additional purpose, for example, recirculation for heating/cooling, tank mixing, and/or foam suppression.

The separator 125 may be in fluid communication with the pump 115 and is configured to separate grit from the wastewater pumped from the vessel 105. In some embodiments, a second pump or other means may be used to pump or otherwise introduce one or more fluid streams (e.g., wastewater from the vessel and/or diluted wastewater from the vessel) to the separator 125. The separator 125 has a first outlet 127 for discharging a grit stream 130 and a second outlet 129 for discharging a wastewater stream 124. The separator 125 may be configured to use one or more removal mechanisms for separating grit from the wastewater, non-limiting examples of which are described below.

Hydrocyclone separators (also referred to herein as a cyclone separator) use a cyclonic inertial separation mechanism. Grit material and heavier suspended solids collect on the sides and bottom of the cylindrical body of the cyclone due to induced centrifugal forces, while lighter materials are removed from the center through the top of the cyclone. The wastewater may be pumped or otherwise conveyed (e.g., by differential head) to the hydrocyclone under a pressure sufficient to result in high velocity conditions in the cyclone and promote separation. According to some embodiments, the wastewater may be pumped to the hydrocyclone under a pressure in a range of 10-150 psi. The feed pressure of the wastewater that is introduced to the hydrocyclone may depend on several factors, including the system size, the application, and the properties of the wastewater (e.g., TSS concentration etc.). For instance, larger systems may have feed pressures to the hydrocyclone that are near 150 psi or higher.

Gravity separators utilize hydraulic force and a difference in specific gravity between the fluid and entrained solids to remove the solid particles from a fluid stream. Gravity separators include an inlet conduit positioned perpendicular to a sidewall of a gravity separation chamber such that heavier materials move downward under the influence of gravity to a separation or capture chamber. The dimensions of the gravity separation chamber are configured to provide time for the heavier grit material to settle in the chamber and to optimize the hydraulic force. Lighter materials and filtered liquid exit through an outlet positioned in an upper portion of the gravity separation chamber.

Aerated grit chambers separators remove grit by causing the grit to flow in a spiral pattern. Air is introduced into the grit chamber along one side, which causes a perpendicular spiral pattern to flow through the chamber. Heavier particles accelerate and diverge from the spiral streamlines and fall to the bottom of the chamber. Lighter materials remain suspended and are eventually carried out of the chamber.

Vortex chamber separators rely on a combination of centrifugal and gravitational forces to induce separation. Vortex chamber separators include a cylindrical chamber into which the flow enters tangentially along the peripheral wall, which creates a vortex flow pattern. Heavier material settles by gravity into the bottom of the chamber into a grit hopper, while lighter materials exit as effluent at the top of the chamber. The grit that settles into the grit hopper may be removed by a grit pump or an air lift pump.

Horizontal flow separators remove grit from the wastewater by maintaining a constant upstream velocity. Velocity is controlled by proportional weirs or rectangular control sections (e.g., Parshall flumes). At the design horizontal flow velocity, heavier grit materials settle to the bottom of a channel while lighter materials get re-suspended. Grit is removed by a conveyor with scrapers, buckets, or plows. Screw conveyors or bucket elevators may be used to elevate the grit for washing or disposal.

Detritus tanks (also referred to as square tank degritters) are a constant-level, short-detention settling tank that function by reducing the velocity of flow through the tank and increasing the detention time. Detritus tanks can include baffles and weirs to slow the flow rate into the collection tank. The velocity of flow is maintained at a continuous flow rate. In some instances, the sidewalls of the tank are vertical and become more gradually tapered at the bottom to form a trough for grit collection. These devices may include pre-separation grit-washing processes to remove organic material. Some configurations include a grit auger and a rake that removes and classifies grit from a grit sump. One advantage of these types of systems is that they do not require flow control since bearings and mechanical parts are positioned above the fluid line.

Returning to FIG. 1, the wastewater treatment system 100 also includes a return conduit 128 for the wastewater stream 124 that exits the second outlet 129 of the separator 125 and recycles the wastewater stream 124 to one of the inlet 107 of the vessel 105 (FIG. 1) and an inlet to the pump 215 (see FIG. 2, described below). At least a portion of grit contained in the wastewater 102 is removed by the separator 125 to generate wastewater stream 124. According to some embodiments, a volatile suspended solids (VS S) concentration of the wastewater stream 124 exiting the separator 125 is greater than a VSS concentration of wastewater that is introduced to the separator 125. According to some embodiments, the wastewater stream 124 has a VSS concentration in a range of about 30% to about 90%. In certain embodiments the wastewater stream 124 has a VSS concentration of at least 30%. In other embodiments, the wastewater stream 124 exiting the separator 125 has a VSS concentration of at least 50%, and according to still other embodiments, the wastewater stream 124 has a VSS concentration of at least 70%.

The grit stream 130 exiting the first outlet 127 of the separator 125 may be introduced to a first inlet 137 of the grit washing system 135. The grit washing system 135 is configured to wash and dewater grit from the grit stream 130. The grit washing system 135 is therefore in fluid communication with the first outlet 127 of the separator 125. One or more valves (not shown in FIG. 1) may be positioned along a conduit connecting the first outlet 127 of the separator 125 and the first inlet 137 of the grit washing system 135. The valves may function to perform periodic purging of the separator 125 and to prevent clogging and accumulation of grit material.

The grit washing system 135 is also in fluid communication with a source of washing fluid 140. The washing fluid 140 may be sourced from other fluid streams in the plant, such as the treated wastewater 109 exiting the vessel 105, other suitable fluid streams sourced from the wastewater treatment system 100, and/or from upstream or downstream processes from the wastewater treatment system 100. The washing fluid 140 used to wash the grit stream 130 may have a total suspended solids (TSS) concentration of less than 1% (10 g/L), for example, between 10 mg/L and 30 mg/L. The washing fluid 140 may be applied as a high-pressure spray to the grit stream 130. For instance, the washing fluid 140 may have a pressure in a range of about 10 psi to about 150 psi.

According to some embodiments, the grit washing system 135 may be configured to perform screening operations on the grit stream 130. For example, in certain embodiments openings in a screen surface included in the grit washing system may have a diameter in a range of about 10 micrometers to about 12 millimeters, or from about 75 micrometers to about 500 micrometers. In some instances, screening of the grit stream 130 may be performed at the same time as washing fluid 140 is applied, but in alternative applications screening and washing the grit stream 130 are performed in separate sequential acts.

According to at least one embodiment, the grit washing system 135 includes a drum filter having a rotary drum with a filter surface having a first side facing an interior of the drum and a second side facing an exterior of the drum. The second side of the filter surface may be fluidly connectable with the grit stream 130 and the source of washing fluid 140. The filter surface may be used to screen the grit material while washing fluid 140 is sprayed or otherwise applied to the filter surface. The filter surface may therefore have openings sized as described above in reference to the screening operation.

Examples of suitable grit washing systems that may be used in embodiments of the disclosed invention include the RoSF and RoSF4 series grit washing systems available from Huber Technology Inc. (Huntersville, N.C.).

The washing fluid 140 and any organic material removed from the grit stream are discharged from the grit washing system 135 via outlet 141 as wash wastewater stream 142. In accordance with at least one embodiment, the wastewater treatment system 100 further includes a return conduit 148 configured to recycle the wash wastewater stream 142 to the inlet 107 of the vessel 105. Washed and dewatered grit exits the grit washing system 135 as grit material 144. According to some embodiments, the TSS concentration of the grit material 144 is at least 40% (at least 400 g/L). In other embodiments, the TSS concentration of the grit material 144 is at least 70% (at least 700 g/L). The grit material 144 may be further processed and/or disposed of as waste.

According to some embodiments, the wastewater treatment system 100 also includes a dilution water supply 120. The dilution water supply 120 is in fluid communication with wastewater pumped out of the vessel (labeled as 114) by the pump 115. The dilution water supply 120 may be used to dilute the wastewater 114 pumped out of the vessel and mixes with this water to form diluted wastewater stream 122. The dilution water supply 120 may include water having low TSS concentration values. For instance, the dilution water supply 120 may have a TSS concentration of less than 1% (less than 10.0 g/L). According to some embodiments, the dilution water supply 120 may be sourced from the same water as the washing fluid 140. Dilution water may be added to achieve a target TSS value or range of TSS values of the diluted wastewater stream 122 entering the separator 125 that maximizes the removal efficiency of the separator 125. One or more valves 126 may be used to control a flow rate of the dilution water supply 120 that is added to the wastewater 114 from the vessel.

According to certain embodiments, the wastewater treatment system may include one or more sensors 155. For example, one or more sensors may be used to measure at least one property of wastewater or grit streams at one or more locations in the system, such as wastewater contained within an internal volume of the vessel, wastewater exiting the vessel, wastewater entering the separator, exit streams from the separator, and exit streams from the grit washing system. The at least one property may be any chemical, physical, or biological property of the wastewater that may be used to monitor and/or control a wastewater treatment process. Non-limiting examples of such properties include conductivity, temperature, pH, and concentration or levels of total suspended solids (TSS), volatile suspended solids (VSS), dissolved oxygen (DO), oxidation reduction potential (ORP), nitrate ($NO_3^-$), nitrite ($NO_2^-$), ammonia ($NH_3$), ammonium ($NH_4^+$), total nitrogen (TN), orthophosphate ($PO_4^{3-}$), and/or total phosphorous (TP). Other sensors may be used to measure flow rate, pressure, fluid level in the vessel, or other operating conditions or parameters of the wastewater treatment system.

The sensor(s) 155 may be in fluid communication with one or more fluid streams containing wastewater or grit for purposes of taking measurements. Non-limiting examples of locations for one or more sensors 155 are shown in FIG. 1. For instance, a sensor 155 may be positioned within the vessel 105, at the inlet of the separator 125, at the wastewater stream outlet 129 of the separator 125, at the grit stream outlet 127 of the separator, at the inlet to the pump 115, at the outlet 141 of the grit washing system 135, and/or a sensor 155 may also be used to measure one or more properties of grit material 144 exiting the grit washing system 135.

The sensor(s) 155 may be configured to be controlled by the controller 150 and may be capable of receiving an input signal from the controller 150 that instructs the sensor(s) 155 to take a measurement. The sensor(s) 155 may also be configured to send or otherwise transmit an output signal containing an indication of the measured property value back to the controller 150. As described herein, the controller 150 may use the measured value to control one or more components of the water treatment system 100, including the pump 115.

In some embodiments, at least one sensor 155 may be configured to measure one or more properties of the wastewater treatment system 100 on a continuous basis. For instance, the controller 150 may instruct the at least one sensor 155 to measure continuously and send the measured values back to the controller 150. In some embodiments, one or more sensors 155 positioned within the internal volume of the vessel 105 may be configured to measure on a continuous basis. In other embodiments, sensors 155 positioned external to the vessel 105 may be configured to measure on a continuous basis.

The wastewater treatment system 100 also includes a controller 150 that is in communication or otherwise operatively coupled to the sensors 155 and/or one or more components of the wastewater treatment system 100. The controller 150 may be a single control unit or may include several control units. The sensors 155 are configured to transmit to the controller 150 measured values and based on the signals received from one or more sensors 155, the controller 150 can generate and send control signals to at least one component of the water treatment system 100, such as valves and pumps. For instance, in one embodiment, the controller 150 is configured to control power to the pump 115 such that the pump starts and begins pumping wastewater 102 from the vessel 105 via outlet 113. In another example, the pump 115 may include a variable speed drive (VSD) or variable frequency drive (VFD) that allows power to the pump 115 to be modulated. For instance, power to the pump 115 may be increased to increase the flow rate through the pump 115. In other embodiments, power to the pump may be decreased to decrease the flow rate through the pump 115. According to various aspects, the controller 150 may function to facilitate or regulate operating parameters of the wastewater treatment system 100.

In accordance with one embodiment, the controller 150 is configured to control the pump 115 such that the pump 115 continuously pumps wastewater out of the vessel 105. In other embodiments, the controller 150 is configured to control the pump 115 such that the pump 115 continuously pumps wastewater out of the vessel 105 for a predetermined length of time. In accordance with one embodiment, the controller 150 is configured to control the pump 115 such that the pump 115 continuously pumps wastewater out of the vessel for a predetermined length of time per day. According to some embodiments, at least one of the sensors 155 is configured as a flow meter that measures a flow rate of one or more fluid streams in the system, such as wastewater 114 pumped out of the vessel and/or the wastewater stream 124 exiting the separator, and the controller 150 is configured to calculate the predetermined length of time based at least in part on the measured flow rate. In certain embodiments, wastewater 102 is removed from the vessel 105 for a predetermined length of time per day. In at least one embodiment, at least one of the sensors 155 is configured to measure a TSS concentration, such as a TSS concentration of wastewater 102 in the vessel, wastewater 114 pumped out of the vessel, and/or the wastewater stream 124 exiting the separator, and the controller 150 is configured to control the pump 115 based on at least one of these measurements. For instance, grit content in the wastewater may be exhibited by TSS concentration levels, and thus measured TSS values may be used to monitor the rate at which grit is being removed from wastewater in the vessel. The predetermined length of time may also be based on a desired turnover value of the active volume of the wastewater 102 in the vessel 105 (wastewater exits the vessel 105, is pumped to and passes through the separator 125 and returns to the vessel).

According to some embodiments, the controller 150 is configured to determine a flow rate of wastewater exiting the vessel and introduced to the separator. In some instances, this determination may be based on a predetermined or measured rate of grit accumulation, example calculations of which are described below. In accordance with various aspects, the rate of grit accumulation in the vessel 105 may be used to determine the desired capacity of the separator 125. For instance, in one example discussed below, it was determined that grit accumulated at a rate of 25,000 gallons/year in a 600,000 gallon tank and that a separator capable of removing grit from wastewater at a rate of 1.50 kg/hour was adequate to address this rate of accumulation.

In accordance with some embodiments, the flow rate of wastewater may be determined based on the size of the vessel 105 (i.e., volume of the vessel) and the detention time of the wastewater 102 in the vessel 105. For example, for a desired tank turnover of 3x within a process detention time of 21 days and a tank size of 600,000 gallons, a flow rate of approximately 60 gallons/minute is required (assuming 24/7 operation).

The controller 150 may be implemented using one or more computer systems which may be, for example, a general-purpose computer such as those based on an Intel® CORE™-type processor, a Motorola PowerPC® processor, a Hewlett-Packard PA-RISC® processor, a Sun Ultra-SPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism may enable communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include the previously described sensors 155 for measuring any one or more parameters of any of the systems disclosed herein and/or components thereof. Alternatively, the sensors, and/or other components of the system, such as valves and pumps, may all be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller 150 can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does the medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general-purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller 150 can be performed in separate computers, which can be in communication with one another through one or more networks.

Figure 2:
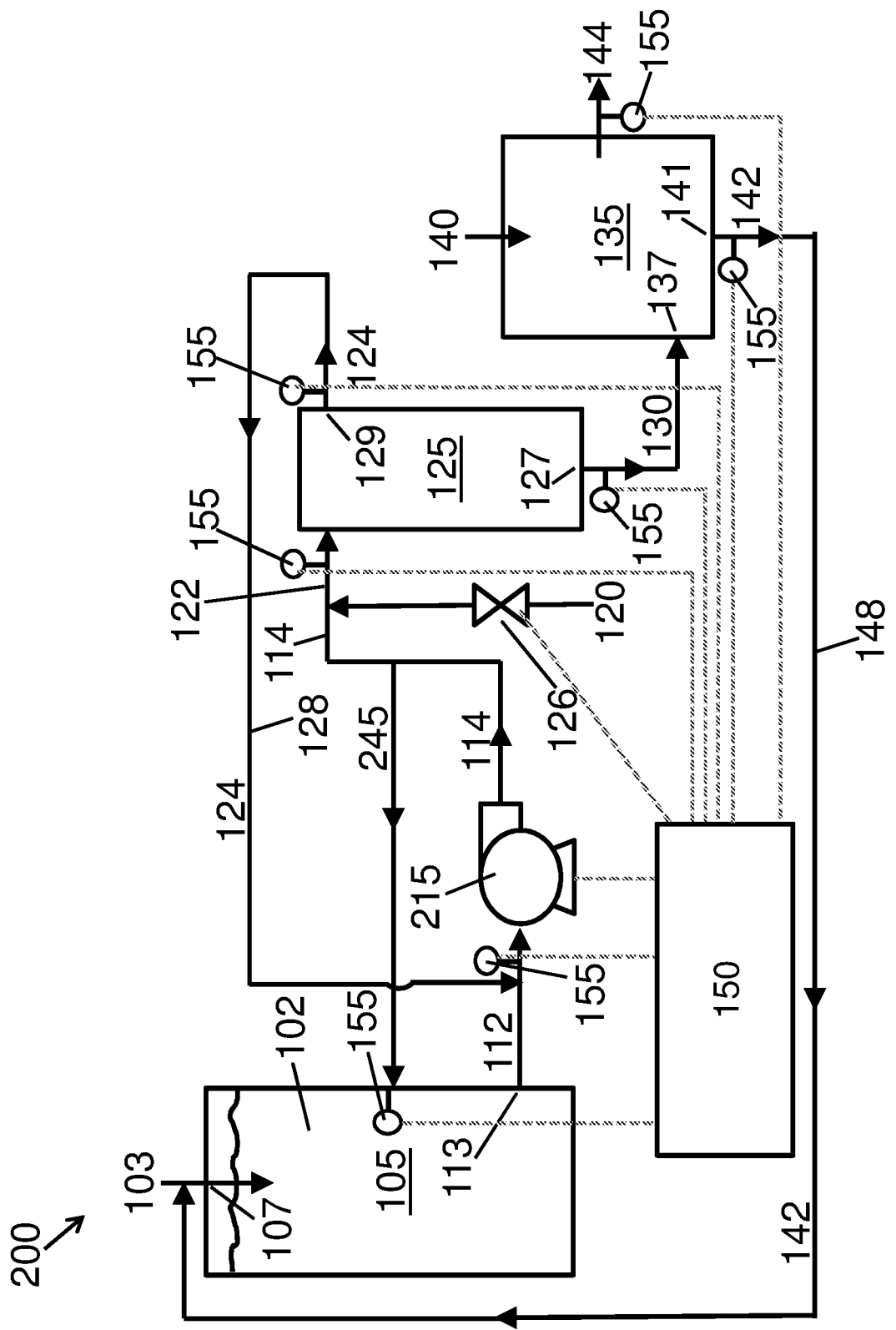
FIG. 2 is a block flow diagram of another example of a wastewater treatment system in accordance with aspects of the invention.
Figure 3:
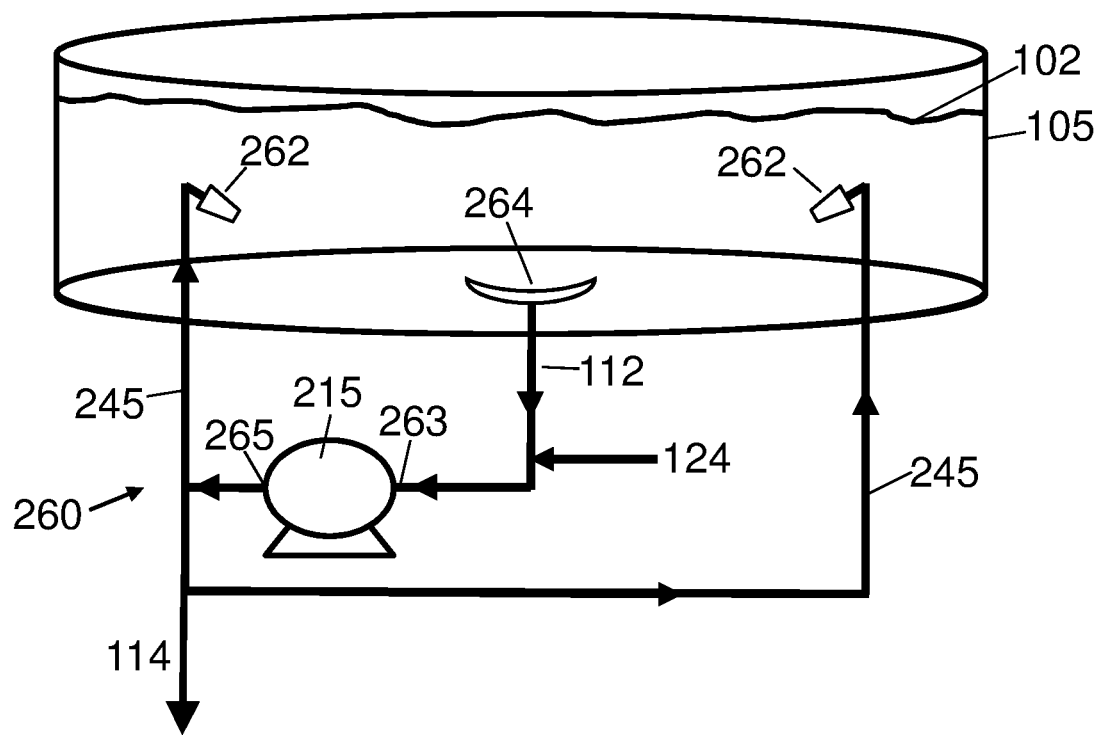
FIG. 3 is a schematic representation of a portion of the wastewater treatment system of FIG. 2 that includes a hydraulic mixing system in accordance with aspects of the invention.

A schematic of a wastewater treatment system according to another embodiment is shown generally at 200 in FIG. 2. The system 200 includes a vessel 105, separator 125, a grit washing system 135, one or more sensors 155, and a controller 150 which may be characterized as previously described in reference to system 100 of FIG. 1. System 200 also includes a pump 215 that forms a component of a hydraulic mixing system 260, one example of which is shown in FIG. 3. The hydraulic mixing system 260 is configured to impart a motive force on the wastewater 102 in the vessel 105. As used herein, the term "hydraulic mixing" refers to imparting a motive force on wastewater in the vessel via hydraulic energy, and certain instances refers to imparting motive force on wastewater in the vessel using a fluid. As described in further detail below, the fluid used by the hydraulic mixing system 260 may be wastewater 102 from the vessel 105.

The hydraulic mixing system 260 includes at least two nozzles 262 or other fluid flow generating devices positioned within the vessel 105. The at least two nozzles 262 may be submerged within the wastewater 102 present in the vessel 105, and in some embodiments, may be mounted to the floor of the vessel 105. In instances where the nozzles 262 are mounted to the floor of the vessel 105, piping to the nozzles may be located underneath the floor of the vessel. The number of nozzles 262 used may depend on a number of factors, including the size of the tank and the particular application. For instance, the number of nozzles may depend on the surface area of the floor of the vessel.

According to various aspects, the nozzles 262 may be configured to provide a discharge velocity for the wastewater of about 35-40 feet per second (fps, 10.7 m/s-12.2 m/s) discharge velocity (based on water as the discharge fluid). In some embodiments, the nozzles 262 are configured to provide a discharge velocity of at least 25 fps (7.6 m/s). Discharge velocities that exceed 40 fps (12.2 m/s) are also within the scope of this disclosure.

In accordance with certain embodiments, the at least two nozzles 262 are configured to generate jet plumes of wastewater that sweep a bottom of the vessel 105 and create a rotating toroidal flow pattern of the wastewater within the vessel 105. The pattern may also include a helical flow pattern of the wastewater within the vessel that follows the surface of the toroid, rises along the vessel wall, and descends into the middle of the vessel 105 to effectively sweep solids from the center of the vessel 105.

Figure 4:
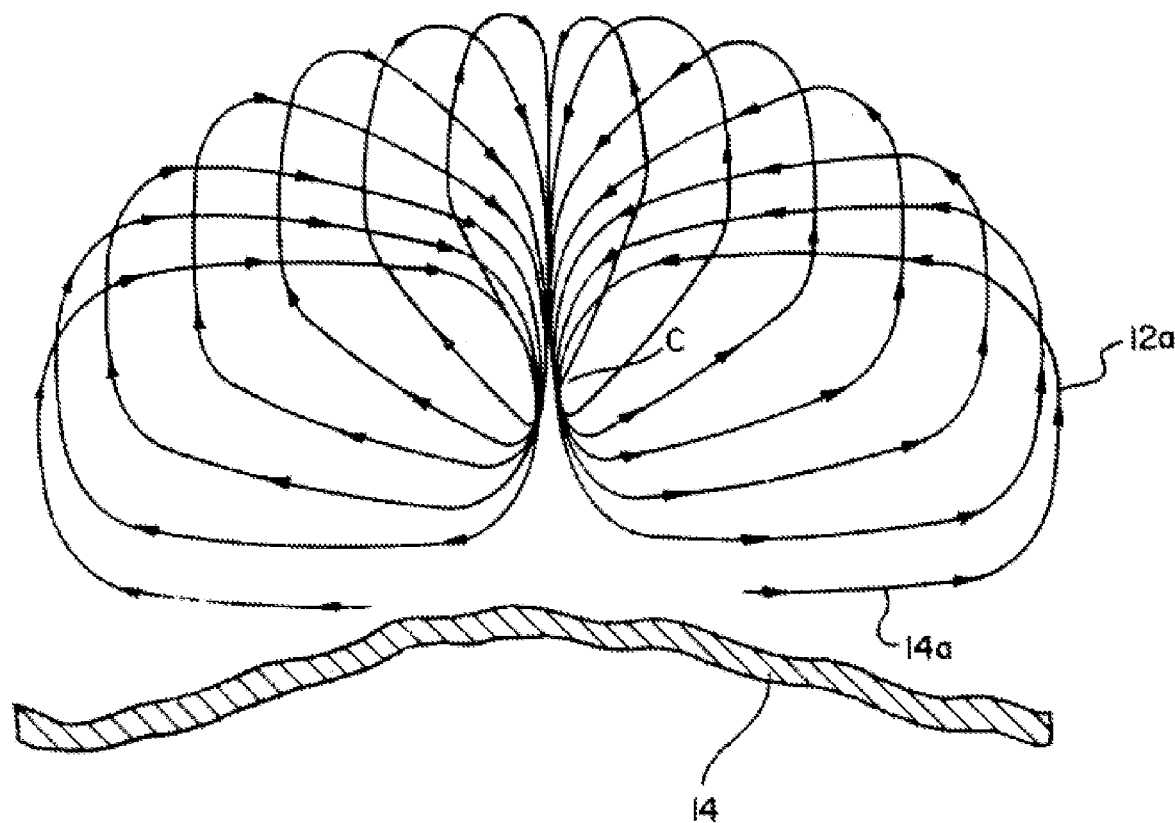
FIG. 4 is a schematic representation of a flow pattern within a vessel.

An example of such a flow pattern is shown in FIG. 4 and is described in U.S. Pat. No. 5,458,414 (herein referred to as the '414 patent), which is incorporated herein by reference. As described in the '414 patent, flow is directed along an outside wall of the vessel, across a surface of the wastewater present in the vessel, and downwardly along the vessel center C. The flow then sweeps across the vessel floor 14, including the point where the vertical center line C intersects the vessel floor 14. As indicated in FIG. 4, the flow pattern is also substantially helical, sweeping out an annular volume having a negligible center radius and an outer radius corresponding to that of the vessel wall. The flow lines shown in FIG. 4 include flow components 14a travelling across the vessel floor 14, and flow components 12a sweeping along the vessel wall, and returning downwardly at the center C of the vessel. This flow pattern creates an intensive mixing at the center of the vessel by creating a vortex-like characteristic therein. According to some embodiments, more than two nozzles may be used, and the number of nozzles may vary according to the size of the vessel, the physical properties of the wastewater 102, and the desired mixing flow pattern.

According to certain embodiments, each nozzle 262 is positioned at a radial distance of about 25% to about 75% from a center of the vessel 105. In further embodiments, each nozzle is positioned at a radial distance about 30% to about 70% from the center of the vessel 105. In some embodiments, at least two nozzles may be positioned along a common "ring" at the radial distance from the center of the vessel. Multiple "rings" of nozzles may be used within the vessel. Each nozzle 262 may be configured to discharge wastewater away from the center of the vessel 105. According to certain aspects each nozzle 262 may be operated through an acute angle ranging between 0 degrees and 60 degrees as measured from a line perpendicular to a radius from the center of the vessel and extending through the nozzle 262. The nozzles 262 may be angled slightly outwardly away from the center of the vessel. In some embodiments, the nozzles 262 are configured to discharge wastewater at an angle of between 3 degrees and about 7 degrees below horizontal. In some embodiments, the nozzles 262 are configured to discharge wastewater at an angle of 5 degrees below horizontal. The size of the diameter or discharge orifice of the nozzles 262 may vary according to the particular implementation. In one embodiment, orifices of the nozzles 262 have a diameter of 6 inches, although it is to be appreciated that the geometry of the nozzle may depend on any one of a number of different factors, including the flow rate, tank geometry, and the particular application. In another embodiment, the nozzles 262 include flow control vanes to reduce turbulence. The nozzles 262 in the vessel 105 may each be directed in a similar manner and may be directed in a clockwise direction.

According to some embodiments, the pump 215 may be of a type of pump as described above in reference to pump 115 of FIG. 1. For instance, the pump 125 may be configured as a chopper pump. In other embodiments, pump 215 is configured to perform as a component of the hydraulic mixing system 120, which requires higher flow rates and/or higher volume of flow than that described above in system 100. The hydraulic mixing system 120 also includes a supply conduit 245 that is fluidly connected or connectable to at least two nozzles 262 and a discharge side 265 of pump 215. A return conduit 112 of the hydraulic mixing system 260 is fluidly connected or connectable to a return inlet 264 and a suction side 263 of pump 215. Pump 215 is fluidly connected or connectable to an internal volume of the vessel via the supply conduit 245 and the return conduit 112. According to certain embodiments, the return inlet 264 is positioned in the center the vessel 105. In some embodiments, the return inlet 264 may be positioned within the floor of the vessel 105, but in other embodiments the return inlet 264 may be positioned above the floor of the vessel 105. According to alternative embodiments, multiple return inlets may be used within the vessel.

The nozzles 262 are fluidly coupled to the supply conduit 245, and the pump 215 is configured to withdraw wastewater 102 from the vessel 105 through the return inlet 264 and the return conduit 112 and the suction side 265 of the pump 215 and introduce wastewater to the vessel 105 through the discharge side 265 of the pump 215, the supply conduit 245, and the nozzles 262. This flow pattern forms a recirculation loop where the pump 215 removes wastewater 102 from the vessel through an outlet of the vessel (i.e., return inlet 264) into the recirculation loop and re-introduces a portion of the wastewater to the vessel through an inlet of the vessel (i.e., nozzles 262). The recirculation loop is thereby fluidly connected between an outlet and inlet of the vessel, and a portion of the wastewater 102 may be introduced to the recirculation loop for purposes of generating a hydraulic mixing effect in the vessel. In addition, the wastewater stream 124 from the separator 125 may also be introduced to the recirculation conduit 112, as indicated in FIG. 3. The remaining portion of wastewater that is not returned to the vessel 105 is introduced to the separator 125, as shown in FIG. 2 (and by 114 in FIG. 3). In another embodiment, a pump used for heating/cooling of the wastewater may direct fluid (e.g., a portion of the wastewater) through a side stream and through the nozzles 262.

One example of a suitable hydraulic mixing system that may be used in embodiments of the disclosed invention is the Jetmix™ vortex mixing system available from Evoqua Water Technologies LLC (Warrendale, Pa.).

According to some embodiments, the wastewater stream 124 exiting the second outlet 129 of the separator 125 is recycled to an inlet of the pump 215 via return conduit 128. Once pumped through pump 215, at least a portion of this fluid may then be returned to the vessel 105 using supply conduit 245, or may sent to the separator 125. In alternative embodiments the wastewater stream 124 may be returned directly to the inlet 107 of the vessel 105.

In certain embodiments a portion of the wastewater 102 removed from the vessel 105 is introduced to the recirculation loop for a predetermined length of time. The predetermined length of time may be based one or more factors, including a desired percentage, e.g., at least 90%, or at least 95%, of an active volume of wastewater 102 in the vessel 105 being recirculated (which may be influenced by the portion of wastewater being sent to the separator 125 instead of to the inlet of the pump 215). The predetermine length of time may also be based on measured values taken by one or more sensors 155, as described above in reference to FIG. 1. For instance, in some embodiments, the predetermined length of time may be based at least in part on a measured flow rate, such as the flow rate of wastewater in the recirculation loop, and/or TSS concentration values, such as the TSS concentration values of the wastewater 102 and/or wastewater stream 124. In some embodiments, the predetermined length of time may also be based on an accumulation rate of grit in the vessel 105. The examples below discuss approaches for determining an accumulation rate of grit.

Figure 5:
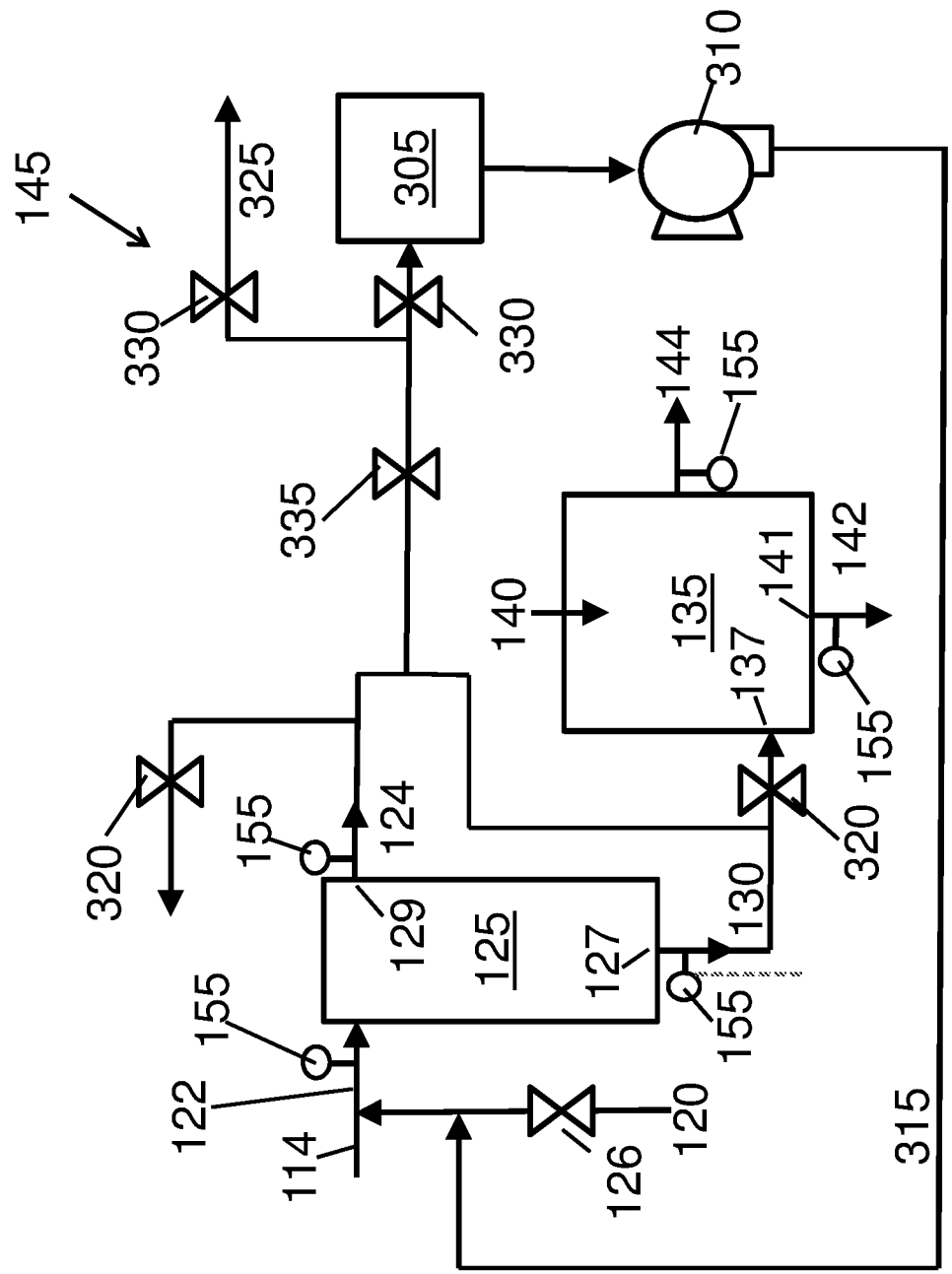
FIG. 5 illustrates a chemical cleaning system that may be utilized in conjunction with embodiments of the wastewater treatment system disclosed herein.

In some embodiments, a chemical cleaning system may be provided as an add-on to the dilution system. The cleaning system may include a chemical addition system 145, which may include a supply of a chemical cleaning agent, for example an acid. The chemical addition system is illustrated in FIG. 5, which also illustrates portions of the systems illustrated in FIGS. 1 and 2, with the vessel 105, pump 115 and associated conduits, and controller 150 omitted for clarity. The supply of chemical cleaning agent is illustrated as tank 305 in FIG. 5. A pump 310 may circulate the chemical cleaning agent through at least a portion of the system 100, 200, for example, through the separator 125 if the portion of the system becomes fouled with organic or inorganic material to clean the portion of the system. Cleaning of the portion of the system may restore flow that had been blocked by the organic or inorganic fouling. One or more of the sensors 155 may provide a flow rate measurement to the controller 150, which may initiate the chemical cleaning responsive to the flow rate through the system dropping below a predetermined setpoint. The pump may flow the chemical cleaning agent though conduit 315 to introduce it into the conduit carrying the dilution water from the dilution water supply 120. The chemical cleaning agent, alone or mixed with the dilution water from the dilution water supply 120, may pass through the portion of the system, for example, separator 125 to dissolve or otherwise remove accumulated contaminants. In some embodiments, one or more valves 320 may be closed during the chemical cleaning process (and open during normal operation) to prevent the chemical cleaning agent from entering other portions of the system 100, 200, for example, the vessel 105 and/or grit washing system 135. After passing through the portion of the system, for example, separator 125 used chemical cleaning agent may be returned to the tank 305 or sent out of the system through conduit 325 (e.g., under control of valves 330) to be disposed of or treated and possibly reused. Other valves 335 may be closed when chemical cleaning is not being performed (and opened when chemical cleaning is being performed) to prevent wastewater passing through the portion of the system, for example, separator 125 from flowing into the tank 305 or out of the system through conduit 325.

At least one further embodiment is directed to one or more methods of facilitating treatment of wastewater in a wastewater treatment system. The method of facilitating may function to enhance the performance of one or more treatment processes (e.g., digestion) that are performed in the vessel by removing grit from the wastewater. The method may facilitate improved operation of one or more processes or components of a pre-existing wastewater treatment system. The method may comprise using one or more of the components of the grit removal process and system disclosed herein together with a pre-existing wastewater treatment system. The method may facilitate improvement in operations of a stand-alone wastewater treatment system. The invention contemplates the modification of existing wastewater treatment facilities to retrofit these systems for purposes of implementing the techniques of the invention. For example, an existing wastewater treatment system may be modified in accordance with one or more embodiments exemplarily discussed herein utilizing at least some of the preexisting components.

The method of facilitating may comprise receiving wastewater containing grit into a vessel, providing a pump and a separator, where the pump is configured to remove the wastewater containing grit from the vessel and the separator is configured to remove the grit from the wastewater containing grit to form a grit stream and a wastewater stream. The method may include recycling the wastewater stream to the vessel. In certain instances, the method may also include recycling the wastewater stream to an inlet of the pump. The method may also include washing and dewatering the grit stream in a grit washing system. According to aspects of this example, a grit removal process may implement a wastewater treatment as discussed herein comprising a vessel 105, a pump 115 or 215, a separator 125, a grit washing system 135, and optional chemical addition system 145.

EXAMPLES

Functions and advantages of the embodiments of the systems and techniques disclosed herein may be more fully understood based on the examples described below. The following examples are intended to illustrate various aspects of the disclosed treatment approach but are not intended to fully exemplify the full scope thereof.

Example 1—Exemplary Grit Removal Rate Analysis

After 12 years of operation, an anaerobic digester was cleaned by decommissioning the tank and removing the grit material. During the cleaning process a total of 300,000 gallons of grit material was removed from the 600,000 gallon tank, which was approximately half the active volume of the digester. The rate of grit accumulation was therefore approximately 25,000 gallons/year. Converting gallons to liters and assuming the removed grit material had a TSS concentration of 44% (e.g., see Example 2 below), which converts to 0.044 kg/L, the total mass of grit removed from the digester was 49,896 kg.

Assuming a separator can remove grit from wastewater at a rate of 1.50 kg/hour (e.g., see Example 2 below), and that the separator may be operated continuously for 24 hours a day, 7 days a week for the twelve-year duration, the separator is capable of separating 157,680 kg of grit. Associating the separator removal rate with the rate of accumulation results in 33,264 hours of needed operation for the separator. Over twelve years (~4380 days) this amounts to operating the separator for approximately 8 hours per day to prevent accumulation.

Example 2—Removal of Grit with Anaerobic Digester

A hydrocyclone separator was tested for removing grit from sludge pumped from a primary anaerobic digester. Commercially available hydrocyclones are not conventionally marketed for high TSS fluids (e.g., 2-6% TSS) such as sludge within an anaerobic digester. The removal capability of the hydrocyclone was therefore unknown.

A small-scale system was assembled to perform the test and included a 450 gallon tank, a pump, and a hydrocyclone separator (model VHS-120 available from VAF Filtration Systems, Arvada, Colo.). The tank contained approximately 450 gallons of sludge having a TSS concentration of 2.6%, which was continuously mixed via a mechanical propeller mixer to prevent settling of suspended solids during the testing period. Sludge was pumped from the tank via a submersible sewage pump and was introduced to an inlet of the hydrocyclone, and sludge exiting the hydrocyclone was re-introduced to the tank. Sludge was circulated through the hydrocyclone at a rate of 90 gallons/min for a duration of 60 minutes, which resulted in 12 tank turnovers. Grit material extracted from the bottom hopper of the hydrocyclone was emptied into a sieve and washed to remove the organic material, with the final extraction weight of the grit yielding 1.5 kg of "pure" grit, which signifies a 1.5 kg/hour removal rate for the hydrocyclone.

The VSS concentration data was obtained for each fluid stream, with the results shown below in Table 1. TSS concentration data is also displayed in Table 1. As indicated below, the VSS was increased from 65.6% to 76.0% through the separator.

TABLE 1

| Volatile Suspended Solids Concentration of Fluid Streams | | |
|---|---|---|
| Fluid Stream | VSS (%) | TSS (%) |
| Sludge - Inlet to Separator | 65.61 | 2.66 |
| Sludge - Outlet of Separator | 76.00 | N/A |
| Grit - Extracted and Washed | 24.86 | 44.22 |

The test results indicated that the hydrocyclone separator was capable of effectively separating grit from the sludge wastewater. The organic content of the sludge exiting the hydrocyclone separate increased, and grit material was collected from the separator, which can be disposed of separately. The results indicate that for the tested volume of sludge and its associated TSS value, the total mass of solids is 45.3 kg, and with a removal rate of 1.50 kg/hour it would take the hydrocyclone approximately 30.2 hours to totally remove all grit from the sludge volume.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure and are intended to be within the scope of the examples discussed herein. Accordingly, the foregoing description and drawings are by way of example only.

What is claimed is:
1. A wastewater treatment system comprising:
a vessel having an inlet and an outlet;
a pump in fluid communication with the outlet of the vessel, the pump configured to pump wastewater out of the vessel;
a hydraulic mixing system configured to impart a motive force on wastewater contained in the vessel, the hydraulic mixing system including nozzles disposed within the vessel and configured to generate plumes of wastewater that sweep a bottom of the vessel and create a rotating toroidal flow pattern of the wastewater within the vessel;
a separator in fluid communication with the pump, the separator configured to separate grit from the wastewater, the separator having a first outlet for discharging a grit stream and a second outlet for discharging a wastewater stream;
a grit washing system in fluid communication with a source of washing fluid and the first outlet of the separator, the grit washing system configured to wash and dewater grit from the grit stream, the grit washing system having an outlet for discharging a wash wastewater stream;
a return conduit configured to recycle the wastewater stream discharged from the separator to one of the inlet of the vessel and an inlet to the pump; and
a controller configured to control the pump to remove the wastewater from the vessel for a predetermined length of time, the predetermined length of time based at least in part on an accumulation rate of the grit in the vessel.

2. The wastewater treatment system of claim 1, wherein the return conduit is a first return conduit and the system further comprises a second return conduit configured to recycle the wash wastewater stream from the grit washing system to the inlet of the vessel.

3. The wastewater treatment system of claim 1, further comprising one or more of a dilution water supply and a chemical cleaning system in fluid communication with the wastewater pumped out of the vessel by the pump.

4. The wastewater treatment system of claim 1, wherein the wastewater stream discharged from the separator has a volatile suspended solids (VSS) concentration of at least 30%.

5. The wastewater treatment system of claim 1, wherein the pump is fluidly connectable to an internal volume of the vessel via a supply conduit and a return conduit, the supply conduit fluidly connectable to a discharge side of the pump and the return conduit fluidly connectable to a suction side of the pump.

6. The wastewater treatment system of claim 5, wherein the return conduit is configured to recycle the wastewater stream discharged from the separator to the inlet of the pump.

7. The wastewater treatment system of claim 5, wherein the controller is further configured to control the pump such that the pump continuously pumps wastewater out of the vessel for the predetermined length of time.

8. The wastewater treatment system of claim 7, further comprising a flow meter in communication with the controller and configured to measure a flow rate of wastewater pumped out of the vessel, the controller configured to calculate the predetermined length of time based at least in part on the measured flow rate.

9. The wastewater treatment system of claim 1, further comprising a sensor configured to measure at least one property of wastewater contained in the vessel, the controller in communication with the sensor and the pump and configured to control the pump based on the at least one measured property.

10. The wastewater treatment system of claim 1, wherein the vessel is configured to perform at least one of digestion, blending, and holding.

11. The wastewater treatment system of claim 1, wherein the separator is configured as a cyclone separator.

12. A method for treating wastewater containing grit, the method comprising:

removing the wastewater containing grit from a vessel for a predetermined length of time based at least in part on an accumulation rate of grit in the vessel;

separating the grit from the wastewater containing grit to form a grit stream and a wastewater stream;

washing and dewatering the grit stream to form a grit material and a wash wastewater stream; and recycling the wastewater stream to one of an inlet of the vessel and to the wastewater containing grit removed from the vessel.

13. The method of claim 12, wherein removing the wastewater from the vessel includes:

recycling a first portion of the wastewater containing grit to the vessel without separating grit from the wastewater;

separating the grit from a second portion of the wastewater containing grit to form the grit stream and the wastewater stream; and introducing the first portion of the wastewater containing grit into a recirculation loop fluidly connected between an outlet of the vessel and an inlet of the vessel.

14. The method of claim 13, wherein the first portion of the wastewater containing grit is introduced into the recirculation loop for a predetermined length of time.

15. The method of claim 14, further comprising:

measuring a flow rate of the first portion of the wastewater containing grit in the recirculation loop; and calculating the predetermined length of time based at least in part on the measured flow rate.

16. The method of claim 13, further comprising diluting the second portion of the wastewater containing grit removed from the vessel prior to separating the grit from the second portion of the wastewater containing grit.

17. The method of claim 13, wherein separating the grit from the second portion of the wastewater containing grit comprises passing the second portion of the wastewater containing grit through a cyclone separator.

18. The method of claim 12, wherein the wastewater containing grit is removed from the vessel for a predetermined length of time per day.

19. The wastewater treatment system of claim 1, further comprising conduits configured to direct a first portion of the wastewater from the pump to the separator and to direct a second portion of the wastewater from the pump back into the vessel without first passing through the separator.

* * * * *